Figure 4:
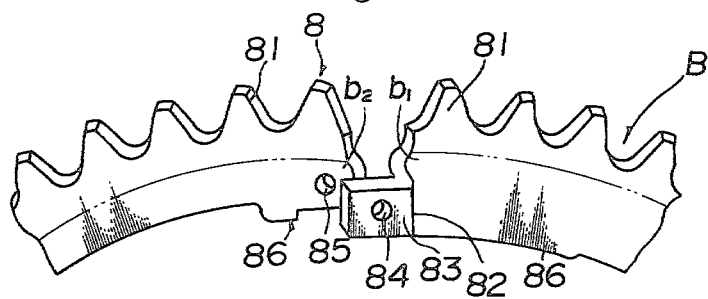

United States Patent

Segawa

[11] 4,318,310
[45] Mar. 9, 1982

[54] GEAR CRANK APPARATUS FOR A BICYCLE

[75] Inventor: Takashi Segawa, Sakai, Japan

[73] Assignee: Shimano Industrial Company, Ltd., Osaka, Japan

[21] Appl. No.: 47,949

[22] Filed: Jun. 12, 1979

[30] Foreign Application Priority Data

Jun. 16, 1978 [JP] Japan .................... 53-83244[U]

[51] Int. Cl.³ .................... G05G 1/14; F16H 55/02
[52] U.S. Cl. .................... 74/594.2; 29/159.2; 29/526 R; 74/447; 74/449; 403/344
[58] Field of Search .................... 74/594.1, 594.2, 445, 74/446, 447, 449; 29/159.2, 518, 526 R; 403/344; 474/203, 100, 152

[56] References Cited

U.S. PATENT DOCUMENTS

| 648,077 | 4/1900 | Ludlow | 74/594.2 X |
| 786,274 | 4/1905 | Duff | 74/446 X |
| 2,385,617 | 9/1945 | Eisenman et al. | 74/449 X |
| 3,407,681 | 10/1968 | Kiernan et al. | 29/159.2 X |
| 3,557,633 | 1/1971 | Frerichs | 29/159.2 X |
| 3,919,898 | 11/1975 | Sugino | 74/594.2 |
| 4,009,621 | 3/1977 | Segawa | 74/447 X |

FOREIGN PATENT DOCUMENTS

| 18-4178 | 4/1943 | Japan . |
| 53-10672 | 3/1978 | Japan . |

Primary Examiner—C. J. Husar
Assistant Examiner—Moshe I. Cohen
Attorney, Agent, or Firm—Stevens, Davis, Miller & Mosher

[57] ABSTRACT

A chain gear for a bicycle is formed from an approximately rectangular metallic band-shaped plate which has gear teeth formed along one edge and which is equal in length to the peripheral length of the chain gear. The band-shaped plate is wound into a ring-shape and end portions of the band-shaped plate are secured together to form the chain gear. The chain gear is secured to a chain gear adapter of a bicycle by a fixing means, the adapter rotating in accordance with a pedalling operation.

3 Claims, 9 Drawing Figures

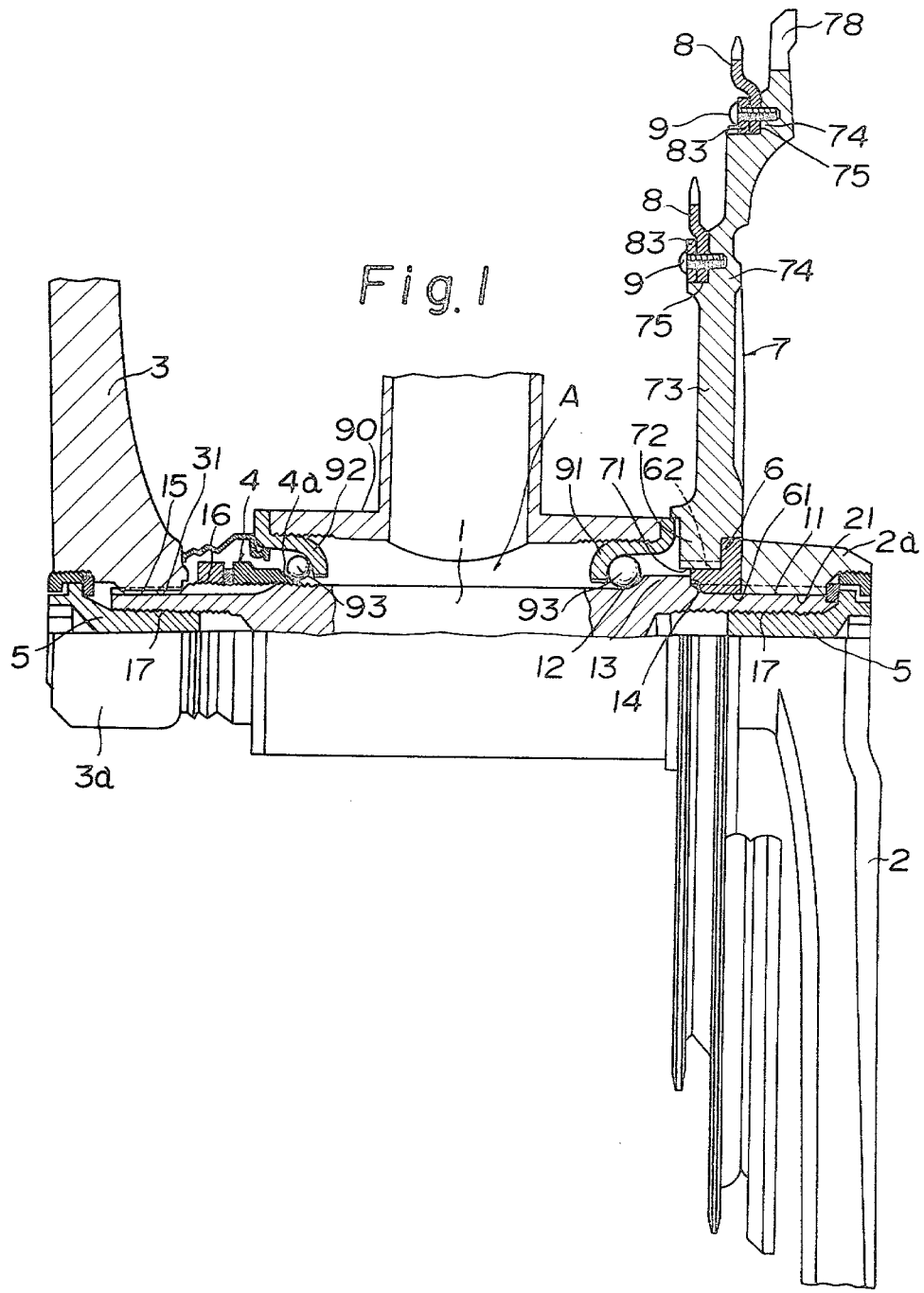

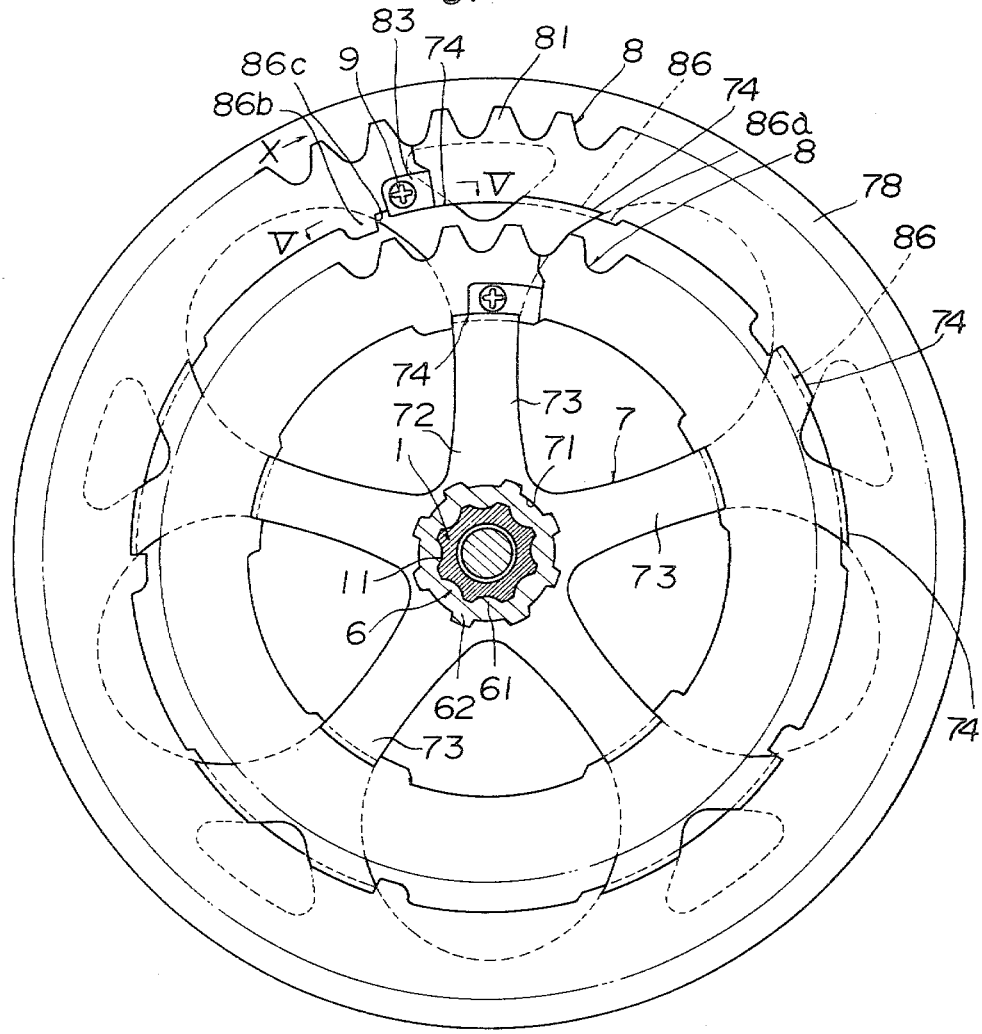
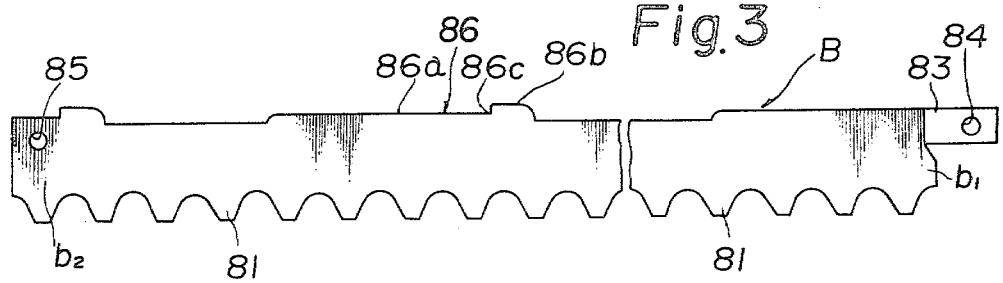

GEAR CRANK APPARATUS FOR A BICYCLE

The present invention relates to a gear crank apparatus for a bicycle and more particularly to a gear crank apparatus for a bicycle where at least a pair of chain gears are mounted through an adapter to a crank which is provided with a crank shaft and a pair of crank arms.

Generally, the chain gear for this type of gear crank apparatus is formed through a punching operation wherein a ring shape gear is punched from a metallic plate such as iron plate, alloy plate or the like. When a plurality of ring shaped chain gears are formed through the punching of one piece of metallic plate, the required trimming operation is not easily performed, the inner side portion of the metallic plate punched in a ring shape is wasted, and the plate material is excessively wasted, thus resulting in added material costs.

The present invention is designed to solve the above-described problems. An object of the present invention is to provide a gear crank, wherein the trimming operation of the metallic plate can be easily performed when the chain gear is formed from a metallic plate through a punching operation and the material waste can be reduced and the material cost thus reduced.

In the present invention, an approximately rectangular, metallic band-shaped plate, which is equal in length to the peripheral length of the chain gear, is wound in a ring shape to form the chain gear. The end portions of the band-shaped plate are secured together and to a gear adapter through a fixing means. A chain gear thus formed eliminates the problem of wasted material.

In the present invention, it is preferable to form in advance teeth or an adapter mounting piece when the band-shaped plate is punched from the metallic plate, but the teeth or the mounting piece may be formed in a punching operation after the band-shaped plate is wound into a ring shape.

Since the winding operation of the band-shaped plate is performed so that one side of the width direction becomes the outer peripheral edge and the other side thereof becomes the inner peripheral edge, the inner peripheral edge tends to rise, in a conic shape, with respect to the outer peripheral edge after the winding operation. Thus, a pressing operation is required so that the inner peripheral edge remains flush with the other peripheral edge after the winding operation. Accordingly, the punch working operation is performed during the pressing operation to form the teeth and the mounting piece. When the inner peripheral edge is made flush with the outer peripheral edge through the pressing operation, the inner peripheral edge becomes somewhat wavy, but this has no influence upon the function of the chain gear.

Figure 5:
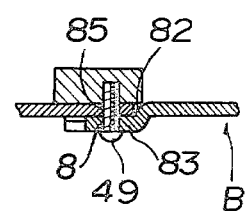
Figure 6:
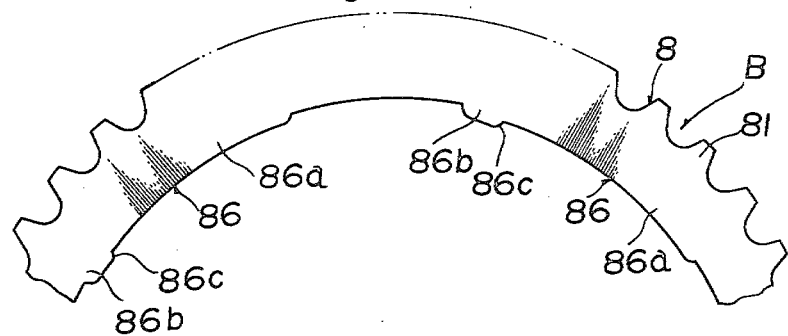
Figure 7:
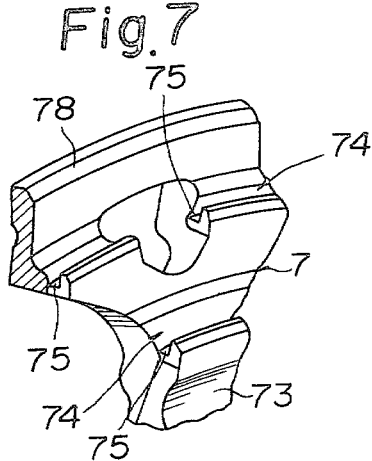
Figure 8:
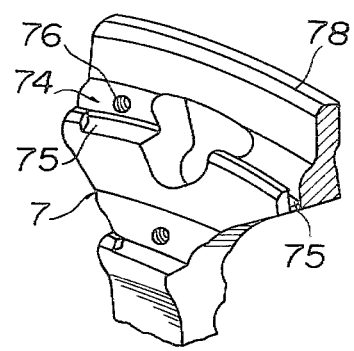
Figure 9:
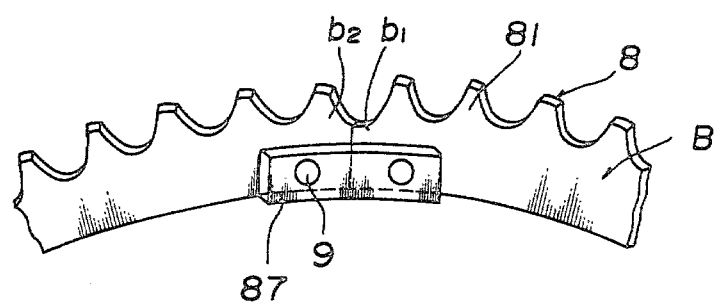

These and other objects of the present invention will be apparent from the following description taken in accordance with the accompanying drawings, in which:

FIG. 1 shows one embodiment of an apparatus of the present invention and a fragmentary-broken front view showing how it is engaged with the bottom bracket of a bicycle, FIG. 2 is a sectional side view of a coupling portion to the crankshaft of an adapter, FIG. 3 is a partially-omitted front view of a band-shaped plate, FIG. 4 is a partial schematic view of a chain gear with a band-shaped plate wound in a ring shape, FIG. 5 is a sectional view, taken along a line V—V, of FIG. 2, FIG. 6 is a front view of one portion of the chain gear, FIG. 7 and FIG. 8 are schematic views each showing one portion of the gear adapter, and, FIG. 9 is a schematic view showing a coupling plate coupling opposite ends of a chain gear plate.

Referring to FIG. 1, the reference character A is a crank composed of a crankshaft 1 and a pair of crank arms 2, 3. A tapered engaging portion 11 with many uneven grooves therein and a larger-diametered portion 13 with a ball receiving face 12 thereon are provided on the outer periphery of one axial end of the crankshaft 1. A stage portion 14 is provided between the engaging portion 11 and the large-diametered portion 13. Also a tapered engaging portion 15 with many grooves therein and a screw portion 16 are provided on the outer periphery of other axial end of the crankshaft. Crank arms 2, 3 have boss portions 2a, 3a respectively provided at their ends. The boss portions 2a, 3a have engaging holes 21, 31 each having many uneven grooves therein, the engaging holes being adapted to be engaged by the engaging portions 11, 15 respectively. These engaging holes 21, 31 are engaged by the engaging portions 11, 15 thereby non-rotatably coupling the crank arms 2 and 3 to the crankshaft 1. The crank arms 2, 3 are held to the crankshaft 1 by a coupling means 5.

The coupling means 5 uses a gib-headed bolt or nut. In a first embodiment, the bolt is used. A tapped hole 17 is provided in the shaft end of the crankshaft 1 which is screwed into the coupling means 5 to couple the crank arms 2, 3 to the crankshaft 1.

Also, referring to FIG. 1, the reference number 6 is a mounting pipe non-rotatably coupled to the engaging portion 11 of the crankshaft 1. The mounting pipe is adapted to mount an adapter 7 (described later) on the crankshaft 1. The outer diameter of the mounting pipe 6 is larger than the outer diameter of the large-diametered portion 13. Many uneven grooves 61 which are engaged into the uneven grooves of the engaging portion 11 are formed in the inner peripheral face of the mounting pipe. Many uneven grooves 62 are provided in the outer peripheral face of the mounting pipe. The uneven grooves 61 of the mounting pipe 6 are engaged into the uneven grooves of the engaging portion 11 to non-rotatably mount the pipe 6 on the crankshaft 1. The adapter 7 which is mounted to the crankshaft 1 by the mounting pipe 6 is formed, by a die casting method, of a light alloy, for example, mainly an aluminum alloy or the like. The central portion of the adapter has a boss portion 72 with an engaging hole 71 therein, which engages the outer periphery of the mounting pipe 6, and support members 73 composed of a plurality of arms extending in a radial direction from the boss portion 72. The inner periphery of the engaging hole 71 has uneven grooves formed therein to engage with the uneven grooves 62 formed in the cylindrical body of the mounting pipe. Thus, the adapter 7 is non-rotatably mounted to the crankshaft 1 through the mounting pipe 6. Also a gear mounting portion 74 with receiving grooves 75 therein is formed at the tip of each of the support members 73 to mount a chain gear 8 (described later) on the mounting portion 74.

The chain gear 8 is formed of a band-shaped plate B (FIG. 3), which is provided by the punching of a piece of rigid metallic plate such as iron plate, alloy plate or the like. The band-shaped plate B is formed in approximately rectangular shape having a length equal to the circular length of the chain gear 8. The band-shaped plate B is wound in a ring shape so that one side of the width direction may become an outer peripheral edge and the other side thereof may become an inner peripheral edge of the chain gear. The band-shaped plate is press-worked so that the outer peripheral edge is flush with the inner peripheral edge, whereby the chain gear 8 is formed.

A plurality of teeth 81 are formed on one side of the width direction of plate B, which becomes the outer peripheral edge of the chain gear when the band-shaped plate B is wound in a ring shape. The teeth 81 are adapted to be punched simultaneously when the band-shaped plate B is punched from the metallic plate. The punching operation may be performed during the pressing operation. When the band-shaped plate B is wound in a ring shape as described hereinabove, the end edge of a first end portion $b_1$ and the end edge of a second end portion $b_2$ on the opposite ends of the plate B are brought into abutment and secured to an adapter 7 by a fixing means to be described later. As shown in FIGS. 2, 4 and 5, a mounting piece 83 of narrower width which is laid on the side of the second end portion $b_2$ is provided, through a stage portion 82, on at least one first end portion $b_1$ or the end portions $b_1$ and $b_2$. The stage portion 82 is confronted with the end face of the second end portion $b_2$ to place the mounting piece 83 upon the second end portion $b_2$ so that they may be secured by a fixing means, to be described later, to the adapter 7. Also, mounting holes 84 and 85 for securing the formed chain gear through a fixing means, to be described later, to the adapter 7 are provided in the first end portion $b_1$, the second end portion $b_2$ or in the mounting piece 83. The mounting piece 83 and the mounting holes 84, 85 are provided during the punching operation of the band-shaped plate B from the metallic plate or during the press working operation like the teeth 81.

In addition, an engaging projection 86, which engages with a receiving groove 75 formed in the mounting end 74 of the adapter 7, is provided on the inner peripheral edge of the plate B, which becomes the inner side when the band-shaped plate B is wound in a ring shape. The engaging projection 86 is provided during the punching operation or the press working operation.

The construction of fixing a chain gear 8 of the following character to the gear adapter 7 will be described hereinafter.

Referring to the drawings, the mounting piece 83 of narrower width is provided to externally project along the length direction from the first end portion $b_1$ of the band-shaped plate B constituting the chain gear 8, through a stage portion 82 equal in length to the thickness of the band-shaped plate B. The mounting holes 84 and 85 are provided to coincide with each other when the mounting piece 83 is superposed on the second end portion $b_2$. The engaging projection 86 is provided on the side edge opposite to a side edge where the teeth 81 are provided, i.e., on one side edge along the width direction, which becomes the inner side when the band-shaped plate B has been wound. As shown in FIG. 8, a tapped hole 76 is provided in one mounting portion 74 among the mounting portions 74 of the adapter 7 to engage the engaging projection 86 with the mounting portion 74. The mounting holes 84 and 85 are aligned with the tapped hole 76 and are secured to adapter 7 with a screw member 9 screwed into the tapped hole 76.

More particularly, as shown in FIGS. 2, 3 and 6, the engaging projection 86 is inwardly projected from the inner peripheral edge when the band-shaped plate B is wound in a ring shape. The engaging projection is composed of a first projecting portion 86a and a second projecting portion 86b which is longer in projecting length than the first projecting portion 86a. A stage portion 86c is formed between these first and second projecting portions 86a and 86b. The first projecting portion 86a of the engaging projection 86 engages into the receiving groove 75 of the mounting portion 74. The second projecting portion 86b does not engage due to the longer projection. The stage portion 86c is adapted to come into engagement against the end face in the mounting portion 74 of the support member 73. Engagement of the first projecting portion 86a with the receiving groove 75 prevents the chain gear 8 from moving in its axial direction. Also, the stage portion 86c comes into contact against the end face of the mounting portion in the support member 73 to prevent rotation of the chain gear in one circumferential direction. The stage portion 86c is desirably provided behind the rotation in the driving direction (x direction of FIG. 2) of the chain gear 8.

The mounting of the chain gear 8 to the adapter comprises the steps of pivoting the gear 8 in the rotating direction (in the direction of arrow x of FIG. 2) of the gear 8 with the inner peripheral portion between the engaging projections 86 and 86 of the chain gear 8 being located in each of a plurality of mounting portions 74 thereby to engage the first projecting portion 86a of the engaging projection 86 into the receiving groove 75 and inserting a screw member 9 through the mounting holes 84, 85 of the chain gear 8 thereby to screw the tip end portion of the screw member 9 into the tapped hole 76 of one mounting portion 74, which has the tapped hole 76 therein.

To fix the chain gear 8 to the adapter 7, the mounting piece 83 overlaps the second end portion $b_2$ of the band-shaped plate B. The mounting holes may be provided in the first and second end portions $b_1$, $b_2$, respectively, without provision of the mounting piece 83. A screw member may extend through these mounting holes to engage into the gear mounting portion 74. Or a coupling plate 87 (FIG. 9) may be used to couple the first end portion $b_1$ to the second end portion $b_2$ to fix, through the coupling plate, the chain gear to the mounting portion 74 by a fixing means such as screw member 9 or the like.

Also, referring to the drawing, two types of chain gears 8 and 8, each being different in diameter and having a different number of teeth, are used and mounted to the adapter 7. These chain gears 8 and 8 are each of the same construction and are mounted with the above-described fixing construction. Also, the adapter 7, as shown in the drawings, has a ring-shaped chain guard 78, which is continuously provided at the tip end of the support member 73. However, this chain guard 78 is not particularly required.

Referring to FIG. 1, numeral 90 is a bottom bracket. Numerals 91 and 92 are bowls which are screwed to the both ends of the bottom bracket 90. A crankshaft 1 is rotatably supported with respect to the bottom bracket 90 by a ball member 93, which is disposed between the ball receiving face provided on the bowl 91 and the ball receiving face 12 of the crankshaft 1, and by a ball member 93, which is disposed between the ball receiving face provided on the bowl 92 and the ball receiving face 4a of a ball biassing member 4 engaged with the screw portion 16 of the crankshaft 1.

In the above-described embodiment, the adapter 7 mounted on the crankshaft 1 through the mounting pipe 6 is described. However, the adapter 7 may be mounted via a direct engagement onto the crankshaft 1. Or the adapter may be mounted on the crank arm 2 or may be formed integrally with the crank arm 2.

As described hereinabove, in the present invention, an approximately rectangular band-shaped plate, which is equal in length to the circular length of the chain gear, is used and the band-shaped plate is wound in a ring shape to form the chain gear. Thus, when a plurality of chain gears are formed through a punching operation from one metallic plate, the trimming of the metallic plate can be performed very easily and the material waste can be reduced, thus resulting in a remarkable reduction in material cost. In addition, since the end portion of the wound band-shaped plate forming the chain gear is secured to the adapter the round condition of the gear can be retained without fail, ensuring an unchanging gear strength which approaches that of a conventional chain gear formed through the punching of a ring-shaped gear.

As many apparently widely different embodiments of the present invention may be made without departing from the spirit and scope thereof, it is to be understood that the present invention is not limited to the specific embodiment described except as defined in the appended claims.

I claim:

1. A gear crank apparatus for a bicycle comprising:
   a crank composed of a crankshaft and a pair of crank arms;
   a gear adapter secured to said crank;
   at least one chain gear secured to said adapter, said chain gear being formed from an approximately rectangular metallic band-shaped plate wound into a ring shape, said band-shaped plate being equal in length to the peripheral length of said chain gear, the outer peripheral edge of said chain gear formed by said wound band-shaped plate containing a plurality of teeth, at least one of said opposite lengthwise ends of said band-shaped plate being provided with a mounting piece, which overlaps the other of said lengthwise ends when said band-shaped plate is wound in a ring shape, the mounting piece and the other of said lengthwise ends having respective mounting holes;
   said gear adapter having a boss portion provided with an engaging hole at the center thereof for engaging with said crank and a support member extending in a radial direction from said boss portion, said support member having a plurality of mounting portions for mounting said chain gear at least one of said mounting portions having a tapped hole; and
   a screw means for securing opposite lengthwise ends of said band-shaped plate to said mounting portions said screw means passing through said mounting holes and engaging with said tapped hole.

2. A gear crank apparatus for a bicycle according to claim 1, wherein the support member of said adapter is composed of an arm and said chain gear is provided on its inner periphery with an engaging projection having a first projecting portion, a second projecting portion which is longer than said first projecting portion and a stage portion between said first and second portions, the mounting portion of said support member having a receiving groove for receiving said first projecting portion so that said stage portion contacts with an engaging face of said support member when said first projecting portion is engaged in said receiving groove.

3. A gear crank apparatus for a bicycle comprising:
   a crank composed of a crankshaft and a pair of crank arms;
   a gear adapter secured to said crank;
   at least one ring shaped chain gear secured to said adapter, the outer peripheral edge of said chain gear containing a plurality of teeth;
   said gear adapter having a boss portion provided with an engaging hole at the center thereof for engaging with said crank and a support member extending in a radial direction from said boss portion, said support member having a plurality of mounting portions for mounting said chain gear, said support member comprising an arm and said chain gear being provided on its inner periphery with an engaging projection having a first projecting portion, a second projecting portion which is longer than said first projecting portion and a stage portion between said first and second portions, the mounting portions of said support member having a receiving groove for receiving said first projecting portion so that said stage portion contacts with an engaging face of said support member when said first projecting portion is engaged in said receiving groove; and
   a fixing means for securing said chain gear to said mounting portions.

* * * * *